United States Patent Office 3,076,816
Patented Feb. 5, 1963

3,076,816
PROCESS FOR PRODUCING 3-PHENYL-2,4-PYRROLIDINE DIONES
Charles A. Miller, Detroit, Mich., assignor to Parke, Davis & Company, Detroit, Mich., a corporation of Michigan
No Drawing. Original application Nov. 28, 1958, Ser. No. 776,732, now Patent No. 3,004,037, dated Oct. 10, 1961. Divided and this application Feb. 10, 1961, Ser. No. 88,286
2 Claims. (Cl. 260—326.5)

This invention relates to novel compositions of matter and to means of producing the same. More particularly, the invention relates to 3-phenyl-2,4-pyrrolidinedione compounds having the formula

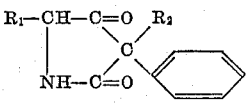

in which formula $R_1$ represents hydrogen or a methyl group and $R_2$ represents a lower alkyl group, especially an alkyl group containing from one to four carbon atoms.

Prior to the present invention, various alkyl substituted pyrrolidinedione compounds were known and it was further known that certain of these compounds possess the ability to produce sleep and in some cases to protect against epileptic convulsion. The compound 3-ethyl-3-propyl-2,4-pyrrolidinedione, for example, possesses anticonvulsant properties but causes profound hypnosis when administered at a dosage of 250 mg./kg. and hence is of no practical value as an anticonvulsant agent. Because of this unfavorable characteristic, the known alkyl substituted pyrrolidinediones in general are wholly unsuited as agents for the treatment of epilepsy.

According to the present invention there are provided novel phenyl substituted pyrrolidinedione compounds which while possessing significant anticonvulsant properties, are surprisingly free of toxic side-effects and hence are applicable for the treatment of petit mal epilepsy.

In accordance with the invention, the instant pyrrolidinedione compounds are produced by reacting a 4-phthalimidoacetoacetic acid ester having the formula

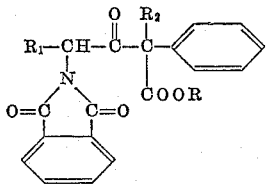

with substantially one equivalent of hydrazine in the presence of an inert organic solvent, where R, $R_1$ and $R_2$ have the aforementioned significance. The temperature of the reaction is not critical and can be varied widely. The preferred range of temperature is about 40 to 100° C. The hydrazine can be supplied in any convenient form such as hydrazine hydrate and the like. Various inert solvents for the reaction are satisfactory such as methanol, ethanol, dimethyl formamide, etc.

The invention is illustrated by the following examples.

*Example 1*

17 g. of bromine is added dropwise to a cold solution of 22 g. of ethyl 2-methyl-2-phenylacetoacetate in 500 ml. of ether. After complete addition the pale yellow solution is stirred for one hour at ice bath temperatures. Then the solution is added with shaking to an equal quantity of ice and water. The ether layer is separated and washed with 5% solution of sodium bicarbonate. The ethereal solution is dried and evaporated. The residual oil is crude ethyl 4-bromo-2-methyl-2-phenylacetoacetate. This oil is added to 130 ml. of dimethylformamide and treated with 18.5 g. of potassium phthalimide. The reaction mixture is heated to 75° for one hour, filtered and the filtrate diluted with an equal volume of cold water. The precipitate is removed by filtration and recrystallized from ethanol to give ethyl 2-methyl-2-phenyl-4-phthalimidoacetoacetate; M.P. 122–123° C.

20 g. of ethyl 2-methyl-2-phenyl-4-phthalimidoacetoacetate and 3.3 g. of hydrazine hydrate in 100 ml. of methanol are heated at reflux temperature for one hour. The reaction mixture is cooled and filtered. The filtrate is evaporated to dryness and the residual product, 3 - methyl - 3 - phenyl - 2,4 - pyrrolidinedione, recrystallized from methanol; M.P. 128–130° C.

*Example 2*

To 30 g. of ethyl 2-ethyl-phenylacetoacetate in 100 ml. of ether is added 21.5 g. of bromine dropwise with cooling. After complete addition and decolorization, the pale yellow solution is stirred at 0 to 5° C. for one hour. The solution is added with shaking to an equal quantity of ice water, the ether layer is decanted and washed with 5% solution of sodium bicarbonate. The ethereal solution is dried over anhydrous magnesium sulfate and evaporated. The residual oil which is ethyl 4-bromo-2-ethyl-2-phenyl-acetoacetate is dissolved in 130 ml. of dimethylformamide and treated with 23.7 g. of potassium phthalimide. The reaction mixture is heated to 75° C. for one hour, filtered and the filtrate diluted with an equal volume of cold water. The precipitate is removed and recrystallized from ethanol to give ethyl 4-phthalimido-2-ethyl-2-phenylacetoacetate; M.P. 100–101° C.

11 g. of ethyl 4-phthalimido-2-ethyl-2-phenylacetoacetate, 1.5 g. of hydrazine hydrate and 60 ml. of methanol are refluxed for 2 hours. The reaction mixture is cooled to 30° and filtered. The filtrate is evaporated on a steam bath and the residue treated with 300 ml. of anhydrous ether and filtered. The ethereal solution on evaporation and cooling yields 3-ethyl-3-phenyl-2,4-pyrrolidinedione; M.P. 166–167° C.

*Example 3*

40 g. of ethyl 2-phenylacetoacetate is added dropwise to a mixture of 5 g. of sodium hydride in 500 ml. of dimethylformamide. After fifteen minutes, 30 g. of n-propyl bromide is added in portions and the reaction mixture is then heated for one hour on the steam bath, cooled and filtered. The filtrate is diluted with water and then extracted with ether. The ethereal extracts are washed, dried and evaporated. The residue is distilled in vacuo to give ethyl 2-phenyl-2-propylacetoacetate; B.P. 157–163° C. at 11.5 mm.

13.6 g. of bromine is added dropwise with cooling to 20 g. of ethyl 2-phenyl-2-n-propylacetoacetate in 60 ml. of ether. After complete addition, cooling is discontinued and the reaction mixture allowed to cool to room temperature. The mixture is poured into 100 ml. of ice and water and the ether solution washed well with water and dried. The ether is removed by evaporation and the residue which is crude ethyl 4-bromo-2-phenyl-2-n-propylacetoacetate is added to a solution consisting of 15 g. of potassium phthalimide in 90 ml. of dimethylformamide. The reaction mixture is heated at 75° C. for 1½ hours, filtered and the filtrate diluted with equal volumes of water. The precipitate is removed by filtration and recrystallized from a mixture of ether and petroleum ether to give ethyl 2-phenyl-2-n-propyl-4-phthalimidoacetoacetate; M.P. 110–111° C.

11 g. of ethyl 2-phenyl-2-n-propyl-4-phthalimidoacetoacetate and 1.7 g. of hydrazine hydrate in 50 ml. of methanol is heated at reflux temperatures for one hour. The warm solution is filtered and the filtrate is evaporated. The residual product, 3-phenyl-3-n-propyl-2,4-pyrrolidinedione, is taken up in hot ether and collected as the crystalline precipitate which separates on cooling; M.P. 165–167° C.

21 grams of ethyl 4-methyl-2-phenylacetoacetate in 200 ml. of dimethylformamide is treated with 0.25 g. of sodium hydride for one-quarter hour, 15 g. of methyl iodide is added, and after stirring for one-half hour the reaction mixture is filtered. The filtrate is diluted with water and the resulting product which separates, ethyl 2,4-dimethyl-2-phenyl-acetoacetate, is recovered and purified by recrystallization from ether-alcohol mixture. Bromine (16 g.) is added dropwise to a cold solution of 22.5 g. of ethyl 2-methyl-2-phenylpropionoacetate in 250 ml. of ether. The resulting mixture is stirred for one hour in the cold and then added to an equal quantity of ice and water. The ether layer is separated, washed with 5% aqueous sodium bicarbonate solution, dried and the ether removed by evaporation. The residual product, ethyl 4-bromo-2,4-dimethyl-2-phenylacetoacetate, is taken up in 130 ml. of dimethylformamide, 18.5 g. of potassium phthalimide is added and the mixture is heated at 75° C. for three to four hours. The mixture is filtered and the filtrate diluted with an equal volume of cold water. The resulting ethyl 2,4-dimethyl-2-phenyl-4-phthalimidoacetoacetate which separates is collected, recrystallized from ethanol and heated together with an equivalent quantity of hydrazine hydrate in 100 ml. of methanol at reflux temperature. After one hour the mixture is cooled and filtered, and the filtrate is concentrated by removal of the methanol in vacuo. The residual product, 3,5-dimethyl-3-phenyl-2,4-pyrrolidinedione, is purified by recrystallization from dilute aqueous methanol; M.P. 147–149° C.

This application is a divisional of my copending application Serial No. 776,732, filed November 28, 1958, now U.S. Patent No. 3,004,037.

I claim:

1. Process of producing 3-phenyl-2,4-pyrrolidinedione compounds, which comprises reacting a 4-phthalimido-acetoacetic acid ester having the formula

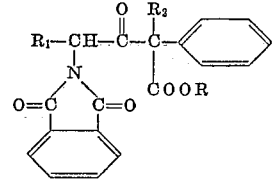

with substantially one equivalent of hydrazine in the presence of an inert organic solvent, where R represents an alkyl radical containing from one to two carbon atoms, $R_1$ is a member of the group consisting of hydrogen and methyl and $R_2$ is a lower alkyl radical.

2. Process according to claim 1 wherein the ester is ethyl 4-phthalimido-2-ethyl-2-phenylacetoacetate.

References Cited in the file of this patent

UNITED STATES PATENTS 2,328,232     Schnider _____ Aug. 31, 1943

OTHER REFERENCES

Barber et al.: "J. Chem. Soc.," page 1335 (1947).